(12) United States Patent
Foreman et al.

(10) Patent No.: US 9,430,603 B1
(45) Date of Patent: Aug. 30, 2016

(54) SCALING VOLTAGES IN RELATION TO DIE LOCATION

(71) Applicant: International Business Machines Corporation, Armonk, NY (US)

(72) Inventors: Eric A. Foreman, Fairfax, VT (US); Nazmul Habib, Colchester, VT (US); Kerim Kalafala, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/959,346

(22) Filed: Dec. 4, 2015

(51) Int. Cl.
*G06F 9/455* (2006.01)
*G06F 17/50* (2006.01)
*G01R 31/317* (2006.01)

(52) U.S. Cl.
CPC ..... *G06F 17/5068* (2013.01); *G01R 31/31718* (2013.01); *G01R 31/31725* (2013.01)

(58) Field of Classification Search
CPC .......... G01R 31/2628; G01R 31/2856; G01R 31/3004; G01R 31/31725; G01R 31/31718; G06F 17/5081; G06F 2217/02; G06F 2217/84; G06F 17/5068; G06F 31/31725
See application file for complete search history.

(56) References Cited

U.S. PATENT DOCUMENTS

| | | | |
|---|---|---|---|
| 8,667,448 B1 * | 3/2014 | Chou | G06F 17/5081 716/106 |
| 8,719,763 B1 | 5/2014 | Bickford et al. | |
| 8,785,930 B2 | 7/2014 | Brambilla et al. | |
| 9,157,956 B2 | 10/2015 | Bickford et al. | |
| 2014/0074422 A1 * | 3/2014 | Bickford | G01R 31/31718 702/118 |
| 2014/0107822 A1 | 4/2014 | Chadwick et al. | |
| 2015/0046739 A1 | 2/2015 | Kuemerle et al. | |
| 2015/0095863 A1 | 4/2015 | Moughabghab et al. | |
| 2015/0212120 A1 | 7/2015 | Singh et al. | |
| 2016/0054380 A1 * | 2/2016 | Walker | G01R 31/025 324/750.03 |

OTHER PUBLICATIONS

Appendix P, List of IBM Patents or Patent Applications Treated As Related, 2 pages, dated Feb. 2, 2016.
Foreman et al., "Scaling Voltages in Relation to Die Location", U.S. Appl. No. 15/009,896, filed Jan. 29, 2016, 26 pages.

* cited by examiner

*Primary Examiner* — Nha Nguyen
(74) *Attorney, Agent, or Firm* — Christopher McLane

(57) ABSTRACT

The method includes identifying, by one or more computer processors, a location that corresponds to an integrated circuit chip on a wafer. The method further includes identifying, by one or more computer processors, an on-chip variation of the integrated circuit chip. The method further includes determining, by one or more computer processes, a desired voltage for the integrated circuit chip based upon the identified on-chip variation of the integrated circuit chip. The method further includes adjusting, by one or more computer processors, the voltage of the integrated circuit chip via a voltage regulated on the integrated circuit chip based upon the determined desired voltage.

17 Claims, 5 Drawing Sheets

| BIN NUMBER | BIN VOLTAGE DEFAULT V |
|---|---|
| 15 | 0.7 |
| 14 | 0.71 |
| 13 | 0.72 |
| 12 | 0.73 |
| 11 | 0.74 |
| 10 | 0.75 |
| 9 | 0.76 |
| 8 | 0.77 |
| 7 | 0.78 |
| 6 | 0.79 |
| 5 | 0.80 |
| 4 | 0.81 |
| 3 | 0.82 |
| 2 | 0.83 |
| 1 | 0.84 |
| 0 | 0.85 |

FIG. 4

SCALING VOLTAGES IN RELATION TO DIE LOCATION

BACKGROUND OF THE INVENTION

The present invention relates generally to the selective voltage binning, and more particularly to adjusting voltage based upon electronic chip identification and location versus across chip value.

As computing systems become smaller and faster, power lost due to current leakage and overall power use increases. Integrated circuit designers are increasingly attempting to raise chip performance but are limited by maximum power limits imposed at the system level. In general, the fastest components of an integrated circuit chip are forced to run faster and at higher voltages in order to achieve enhanced chip performance. Such increased voltages lead to greater current leakage, and therefore, to greater power consumption and overall greater power loss.

On-chip variation (OCV) is a recognition of the intrinsic variability of semiconductor processes and their impact on factors such as logic timing. Historically, as well as operating temperature, timing variation was primarily a consequence of subtle shifts in manufacturing conditions that would lead to integrated circuit chips from one batch of wafers being 'slow' or 'fast' relative to nominal estimates. To account for this, design would run two sets of timing analyses: one for the slow corner and one for the fast corner. If the design passed these two tests, the chip could be considered to have met its timing constraints.

SUMMARY

Aspects of the present invention disclose a method, computer program product, and system for adjusting voltage on an integrated circuit chip. The method includes identifying, by one or more computer processors, a location that corresponds to an integrated circuit chip on a wafer. The method further includes identifying, by one or more computer processors, an on-chip variation of the integrated circuit chip. The method further includes determining, by one or more computer processes, a desired voltage for the integrated circuit chip based upon the identified on-chip variation of the integrated circuit chip. The method further includes adjusting, by one or more computer processors, the voltage of the integrated circuit chip via a voltage regulated on the integrated circuit chip based upon the determined desired voltage.

BRIEF DESCRIPTION OF THE DRAWINGS

FIG. 4 depicts a sample table that depicts voltage differences on chips as related to timing bins of a wafer, in accordance with one embodiment of the present invention;

DETAILED DESCRIPTION

Embodiments of the present invention recognize that on-chip variation (OCV) versus voltage settings change due to die location during the creation of integrated circuit chips. Integrated circuit chips can also be referred to as chips. For example, chips created on the outer rim of a wafer may have a different OCV versus voltage when compared to chips created in the middle of a wafer. Embodiments of the present invention recognize that optimizing OCV during the binning process may reduce power and simplify timing closures. Embodiments of the present invention recognize that in general, the fastest processes on a chip dominate the maximum power for the chip. Typical integrated circuit maximum total power is determined by the leakage at the fast process corner and high temperature. Process variation is recognized as a major source of parametric yield loss, which occurs because a fraction of manufactured chips do not satisfy timing or power constraints. On the other hand, both chip performance and chip leakage power depend on supply voltage. The dependence can be used for converting the fraction of too slow or too leaky chips into good ones by adjusting their supply voltage. Embodiments of the present invention recognize that OCV values recognize a global penalty for all chips on a wafer.

Implementation of embodiments of the invention may take a variety of forms, and exemplary implementation details are discussed subsequently with reference to the Figures.

Figure 1:
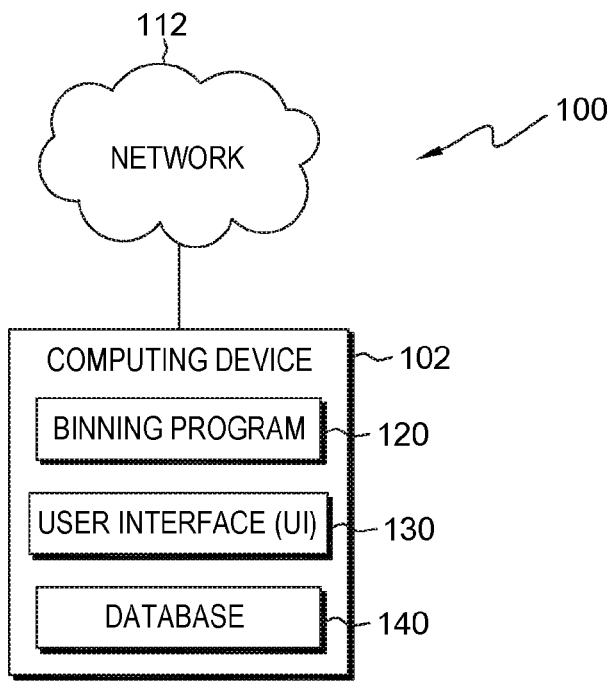
FIG. 1 is a functional block diagram illustrating a distributed data processing environment, in accordance with one embodiment of the present invention.

The present invention will now be described in detail with reference to the Figures. FIG. 1 is a functional block diagram of computing system 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted environment, computing system 100 includes computing device 102 connected to network 112. Network 112 may be a local area network (LAN), a wide area network (WAN), such as the Internet, a cellular data network, any combination thereof, or any combination of connections and protocols that will support communications between computing device, in accordance with embodiments of the invention. Network 112 may include wired, wireless, or fiber optic connections. Network 112 includes one or more wired and/or wireless networks that are capable of receiving and transmitting data, voice, and/or video signals, including multimedia signals that include voice, data, and video information. Computing system 100 may other devices not shown that are able to communicate with computing device 102 via network 112.

Computing device 102 may be any computing device, such as a desktop computer, a laptop computer, a netbook computer, or a tablet computer. In general, computing device 102 may be any electronic device or computing system capable of processing program instructions, sending and receiving data and communicating with network 112. In the depicted embodiment, computing device 102 contains binning program 120, user interface (UI) 130, and database 140. In some embodiments, computing device 102 may include additions programs, databases, or interfaces which are not depicted. In other embodiments, computing device 102 may include binning program 120, UI 130, database 140, and/or other components, as depicted and described in further detail with respect to FIG. 6.

Binning program 120 modifies voltage on chips based upon the chip location or die. In some embodiments, binning program 120 performs preliminary functions prior to modifying voltages on chips. Some examples of preliminary functions may include running timing analysis on chips, generating tables of voltages versus OVC, and generating OCV versus die location tables. In some embodiments, binning program 120 may receive input from outside sources or access a database for information. For example, binning program 120 may receive data containing the electronic chip identification (ECID) of a particular chip. Binning program 120 may then utilize the ECID information to determine the die location of the chip as well as the OVC information of the chip. Binning program 120 may then adjust the voltage of a chip based upon the gather information. In some embodiments, binning program 120 may send data indicating the voltage modifications for a chip to another computing device (not depicted) that carries out the voltage modifications.

In depicted computing system 100, user interface (UI) 130 resides on computing device 102. UI 130 is a computer program that provides an interface between a user and binning program 120. A user interface refers to the information, such as graphic, text, and sound, a program presents to a user, and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

Database 140 may be a repository that may be written to and/or read by binning program 120. A database is an organized collection of data. In some embodiments, various tables may be stored in database 140. In some embodiments, binning program 120 may store tables and information regarding die location and OCV of chips. In some embodiments, database 140 may store ECID's as well as any information associated with the specific ECID. In various embodiments, other programs (not depicted) or other computing devices (not depicted) may be store information related to chips in database 140. Binning program 120 may then access database 140 to identify information stored by other programs or devices. In yet other embodiments, database 140 may comprise multiple databases that may be located on computing device 102, and/or other computing devices (not depicted) but connected via network 112. In other embodiments, database 140 may reside on a server, another computing device (not depicted), or independently as a standalone database that is capable of communicating with computing device 102 via network 112.

Figure 2:
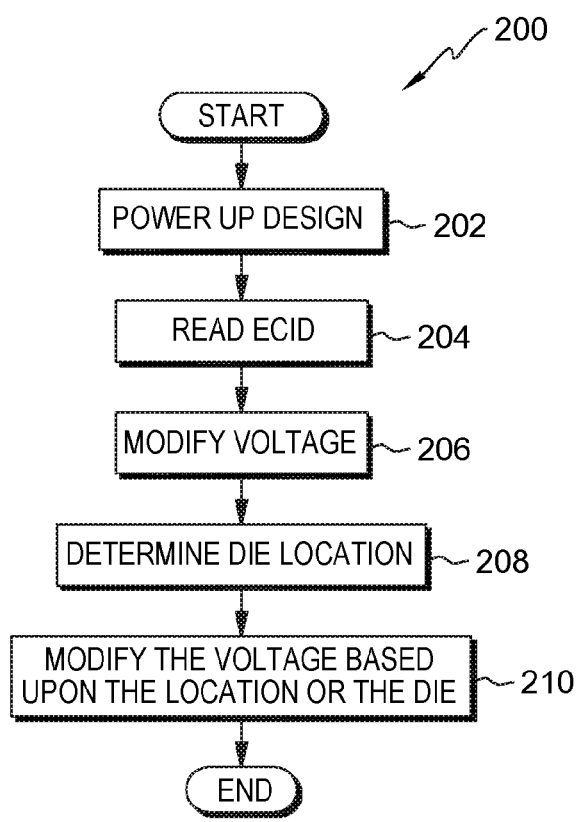
FIG. 2 depicts a flowchart depicting operational steps of a program for suggesting search terms based on received content, executing within the computing system of FIG. 1, in accordance with one embodiment of the present invention.

FIG. 2 is a flowchart depicting operational steps of program 200, which is a function of binning program 120, in accordance with an embodiment of the present invention. In some embodiments, the operational steps of program 200 begin in response to a prompt from a user of binning program 120. In other embodiments, the operational steps of program 200 begin in response to a specific amount of time passing. In yet other embodiments, program 200 begins in response to receiving a notification that a chip is ready for modification.

Program 200 powers up the design (step 202). In various embodiments, program 200 turns on (i.e., powers up) a chip that is going to be tested and possibly modified. In an example, program 200 may send instructions to another computing device to connect the chip to a power source. In another example, program 200 may prompt a user to connect the chip to computing device 102. In yet another embodiment, program 200 may send instructions to another program located on computing device 102 to turn on the power of a selected chip. In various embodiments, program 200 begins the process of turning on a selected chip by other methods known in the art. In yet another embodiment, program 200 may not be responsible for turning on the power in a selected chip; however, program 200 may receive a notification that a chip has been turned on. In an embodiment, program 200 may begin the operational steps of FIG. 2 at step 204.

Program 200 reads the ECID (step 204). In various embodiments, program 200 identifies the ECID of a chip. In an example, program 200 may receive data from a scanning device (not depicted), which reads the ECID imprinted onto the chip. In some embodiments, the ECID may contain various types of information. In an example, the ECID may contain information related to the location of the chip on the wafer (e.g., die location). In another example, the ECID may contain a distance of the radius from the center of the wafer. In another example, the ECID may contain other information, such as the process speed. In other examples, the ECID may contain OCV information, and/or other information deemed important by developers. In some embodiments, the OVC of a chip may be a determined simulation of circuits on the integrated circuit to reach desired performance, looking up the variation in a table (e.g., a table stored in database 140), or any other methods known in the art. In various embodiments, program 200 can determine the die location by measurements taken by another program (not depicted), by a user inputting information about the location of a chip on a wafer, or any other methods known in the art.

Program 200 modifies the chip voltage (step 206). In various embodiments, program 200 modifies the chip voltage based upon select voltage binning (SVB). Modifying the chip voltage by SVB may be done by methods known in the art. For example, program 200 reduces the maximum power on a chip by reducing the voltage on the parts that are faster than nominal, while running the slower than nominal parts at full voltage. SVB divides manufactured chips into several bins and assigns to each bin some value of supply voltage. The voltage of a chip may be adjusted via a voltage regulator to change the power (e.g., increase or decrease speed). In various embodiments, program 200 modifies a chip by modifying the circuitry of the chip and the voltage regulator. Program 200 may modify voltage for optimizing frequency, optimizing system load, power control, temperature control, etc.

Program 200 determines die location (step 208). In various embodiments, program 200 determines the die location of the chip on the wafer. Program 200 determines the amount of additional modification the chip requires for the die location of the chip. In some embodiments, program 200 may identify the OCV as compared to the die location. In an example, program 200 may reference database 140 to identify how the OCV changes across a wafer. In an example, in FIG. 4 containing Bin numbers 0-15, the bin voltage default V changes depending on the bin location. FIG. 4 depicts a table showing bins used to separate chips and the voltage of chips for each bin. Program 200 may identify the die location and determine the OCV based upon the location of the die. In another example, program 200 may compare the actual OCV and die location (gathered in step 204) and compare the information (from step 204) to a database with the expected data stored in database 140.

In other embodiments, program 200 may compare the load voltage to the OCV. The comparison enables program 200 to determine how the voltage changes based upon the OCV. In some examples, program 200 may consult a database with expected data, based upon the determined die location, to identify the how the voltage changes based upon the OCV. In some examples, the OCV may be greater if the die is located near the outside of the wafer. In other examples, the OCV may be less if the die is located near the center of the wafer. Depending on the location of the die and the OCV, the amount to modify the voltage to obtain consistent results across all chips on the wafer may change.

In some embodiments, the OCV may be larger because the die location is near the outside of the wafer. Program 200 may increase the voltage to obtain a similar performance results across the wafer. In another embodiment, program 200 may decrease the voltage on a chip near the center of the wafer, which has less OCV, as to obtain a more consistent performance across the wafer. By adjusting the voltage, program 200 can reduce power and simplify timing closures on chips.

Program 200 modifies the voltage based upon the location of the die (step 210). In various embodiments, program 200 modifies the voltage of a chip via the voltage regulator on the chip. In some embodiments, program 200 may send instructions to another computing device to adjust the voltage of a chip. In other embodiments, program 200 may be located on the chip and adjust the voltage in the voltage regulator. In various embodiments, program 200 may adjust the voltage of a chip based upon the information from steps 204 and 208. In an example, program 200 may determine that the OCV is large based upon the location of the die on the wafer. A large OCV can create a delay and program 200 can increase the voltage to diminish the delay cause by the OCV. In some examples, program 200 may adjust the OCV, timing, and voltage of a chip based upon the die location. In some examples, if the OCV is lower, program 200 can lower the voltage and have less leakage and power. Conversely, if the OCV is higher, program 200 can increase the voltage to decrease the leakage and power.

Figure 3:
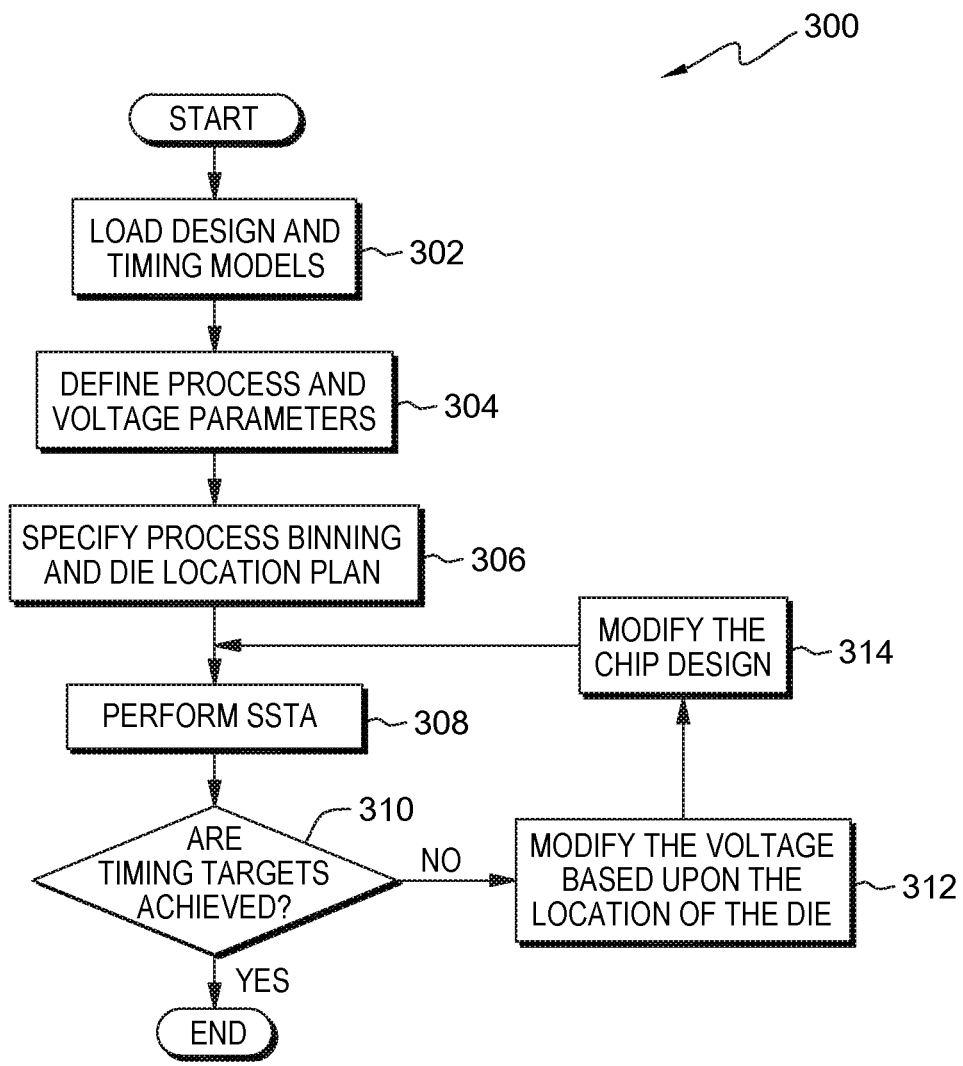
FIG. 3 depicts a flowchart depicting operational steps of a program for suggesting search terms based on received content, executing within the computing system of FIG. 1, in accordance with one embodiment of the present invention.

FIG. 3 is a flowchart depicting operational steps of program 300, which is a function of binning program 120, in accordance with an embodiment of the present invention. In some embodiments, the operational steps of program 300 begin in response to a prompt from a user of binning program 120. In other embodiments, the operational steps of program 300 begin in response to a specific amount of time passing. In yet other embodiments, program 300 begins in response to receiving a notification that a chip is ready for modification.

Figure 5:
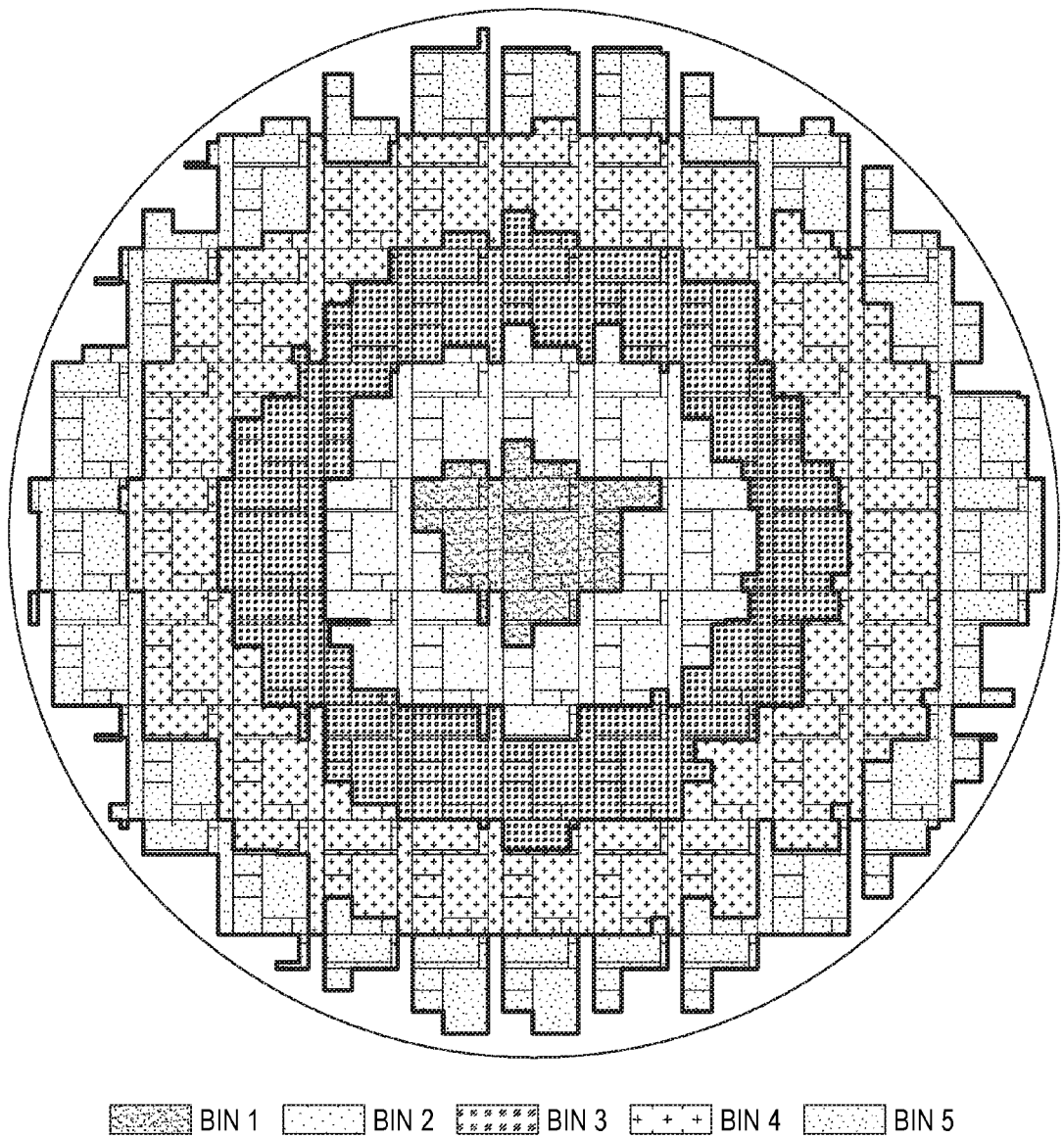
FIG. 5 depicts a sample radial binning plan based upon a timing closures of chips in relation to a distance from the center of a wafer, in accordance with one embodiment of the present invention.

Program 300 loads design and timing models (step 302). In various embodiments, program 300 loads design and timing models for various chips and wafers. In an example, program 300 may receive user input via a user interface (e.g., UI 130) indicating a binning plan to timing closures of chips based upon a radial bin. The physical radius of the wafer may represent a timing bin. In some embodiments, program 300 may identify a specific wafer and chip design and identify a corresponding model from a database (e.g., database 140). In an example, FIG. 5 depicts a radial chip binning plan on a wafer with bins 1-5. In an example, program 300 identifies the design from FIG. 5 for a specific chip, wafer, or multiple chips and wafers.

Program 300 defines the binning process and voltage parameters (step 304). In various embodiments, program 300 determines the die location of the chip on the wafer. Program 300 determines the amount of additional modification the chip requires based upon the die location of the chip. In some embodiments, program 300 may identify the OCV as compared to the die location of a chip or multiple chips on a wafer. In an example, program 300 may reference database 140 to identify how the OCV changes across a wafer. In an example, in FIG. 5 containing radial bins numbered 1-5, the bin voltage default V changes depending on the bin location. FIG. 5 depicts an example of a wafer containing multiple chips. The wafer is divided into five bins based upon the OCV of the chips on the wafer. Program 300 may identify the die location and determine the OCV based upon the location of the die. In an example, program 300 may identify voltage parameters of a chip based upon the loaded design and timing models in step 304. For example, program 300 may assign all chips in each radial bin specific OVC and voltages.

In other embodiments, program 300 may compare the load voltage to the OCV. The comparison enables program 300 to determine how the voltage changes based upon the OCV. In some examples, program 300 may consult a database with expected data (e.g., loaded designs and timing models), based upon the determined die location of each chip, to identify the how the voltage changes based upon the OCV. In some examples, the OCV may be greater if the die is located near the outside of the wafer (e.g., bin 5 in FIG. 5). In other examples, the OCV may be less if the die is located near the center of the wafer (e.g., bin 1 in FIG. 5). Depending on the location of the die and the OCV, the amount to modify the voltage to obtain consistent results across all chips on the wafer may change based upon the radial bin the chip is located in.

In some embodiments, the OCV may be larger because the die location is near the outside of the wafer (e.g., bin 5 of FIG. 5). Program 300 may increase the voltage to obtain a similar performance results across the wafer. In another embodiment, program 300 may decrease the voltage on a chip near the center of the wafer which has less OCV as to obtain a more consistent performance across the wafer. By adjusting the voltage, program 300 can reduce power and simplify timing closures on chips.

Program 300 specifies the binning and die location plan (step 306). In some embodiments, program 300 specifies the binning and die location plan based upon the previously loaded design and timing models as well as the binning process and voltage parameters. In an example, program 300 determines which of the loaded design and timing models from step 302 to utilize when compared to the identified OCV and load voltage from step 304. In an example, program 300 determines that the OCV and load voltage pattern is similar to a specific design and timing model and select a design and timing model based upon the characteristics from step 304. In another embodiment, a user may select the process binning and die location plan from step 302 based upon the identified data from step 304. In yet another embodiment, program 300 may have specific presets which trigger the selection of a binning model (e.g., 5 radial bins in FIG. 5) based upon the data from step 304. In another example, the data from step 304 may indicate that 3 radial bins may be best and program 300 may select a design based upon 3 radial bins.

In some embodiments, program 300 may identify areas on a wafer where the manufacturing of the chip on the wafer has changed the speed of the transistor (e.g., faster or slower). In an example, operating temperature, timing variation was primarily a consequence of subtle shifts in manufacturing conditions that would lead to integrated circuit chips from one batch of wafers being 'slow' or 'fast' relative to nominal estimates. Program 300 may identify areas on a wafer or entire wafers which experienced shifts from nominal estimates. The chips which have experienced shifts may have the voltages adjusted based upon the identified changes from the manufacturing process.

Program 300 performs the statistical static timing analysis (SSTA) (step 308). In various embodiments, program 300 performs the SSTA on a chip to determine the timing of a chip. In an embodiment, program 300 utilizes a path-based algorithm, and sums gate and wire delays on specific paths. In another embodiment, a block-based algorithm generates the arrival times (and required) times for each node, working forward (and backward) from the clocked elements. In yet other embodiments, other methods known in the art may be utilized. For example, program 300 may determine timing of gates and interconnects with probability distributions, and give a distribution of possible circuit outcomes rather than a single outcome.

Program 300 determines if timing targets are achieved (decision 310). In various embodiments, program 300 determines if timing targets are achieved based on the SSTA from step 308. For example, program 300 may determine if a timing target that was selected in step 306 was achieved after performing the SSTA in step 308. Program 300 may identify the die location and bin of a chip and the expected timing for the chip based upon the specified die location plan and binning in step 308. Program 300 may then compare the expected timing to the timing results from step 308.

If the timing target is achieved (yes branch, decision 310), then program 300 may store the information in a database associated with the chip ECID. In another embodiment, program 300 identifies another chip to analyze if the timing target is achieved.

If the timing target is not achieved (no branch, decision 310), then program 300 modifies the voltage based upon the location of the die (step 312). In various embodiments, program 300 modifies the voltage of a chip via the voltage regulator on the chip. In some embodiments, program 300 may send instructions to another computing device to adjust the voltage of a chip. In other embodiments, program 300 may be located on the chip and adjust the voltage in the voltage regulator. In various embodiments, program 300 may adjust the voltage of a chip based upon the information from steps 306 and 308. In an example, program 300 may determine that the OCV is large based upon the location of the die on the wafer. A large OCV can create a delay and the voltage will be increase to diminish the delay cause by the OCV. In some examples, program 300 may adjust the OCV, timing, and voltage of a chip based upon the die location. In some examples, if the OCV is lower, program 300 can lower the voltage and have less leakage and power. Conversely, if the OCV is higher 300 can increase the voltage to decrease the leakage and power.

Program 300 modifies the chip design (step 314). In various embodiments, program 300 may not have modified the voltage of a chip in step 312, but rather skipped step 312 and modified the chip design to reach a similar outcome. In other embodiments, program 300 may make voltage modifications in step 312 and still make chip design modifications in step 314 to reach desired results. In an example, program 300 determines from the SSTA in step 308 that the timing target difference would require both a chip design modification and a voltage modification. In the example, program 300 may adjust the voltage via a voltage regulator located on the chip and adjust the chip design by adjusting wire thickness within the chip. Program 300 may send instructions to another computing device, not depicted which includes the desired wire thickness to reach a desired result. In another example, program 300 may send a prompt to a user of binning program 120 via UI 130 indicating the required chip modification. In yet other embodiments, voltage modification in step 312 may allow a chip to reach desired results and therefore program 300 skips step 314.

After program 300 modifies the voltage, program 300 returns to step 308 and performs the SSTA.

Figure 6:
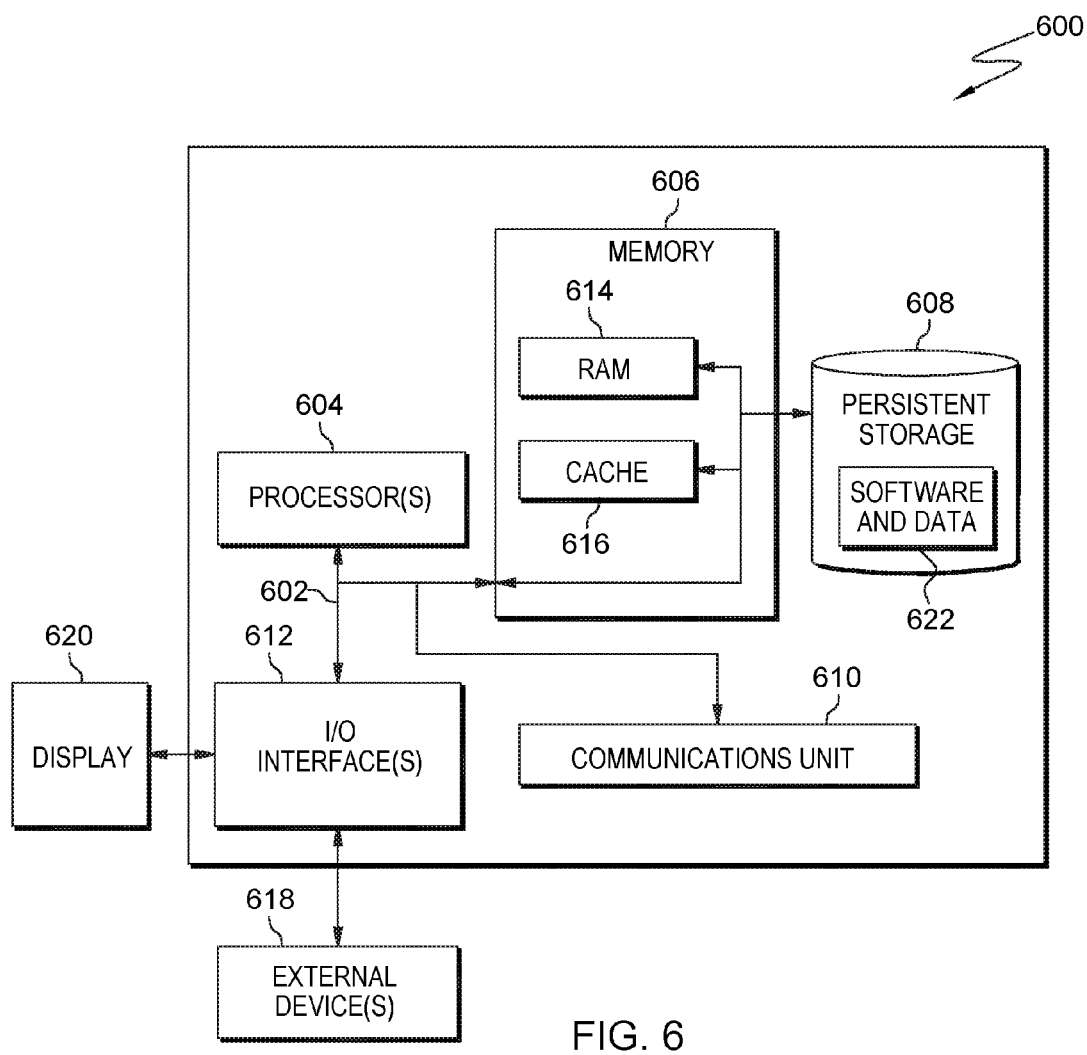
FIG. 6 depicts a block diagram of components of the server and/or the computing device of FIG. 1, in accordance with another embodiment of the present invention.

FIG. 6 depicts computer system 600, which is an example of a system that includes components of server 30 and/or computing device 102. Computer system 600 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, and/or some other suitable input device. External device(s) 608 can also include portable computer readable storage media such as, for example, thumb drives, portable optical or magnetic disks, and memory cards. Software and data used to practice embodiments of the present invention, e.g., binning program 120, database 140, and UI 130 can be stored on such portable computer readable storage media and can be loaded onto persistent storage 605 of computing device 102 via I/O interface(s) 606 of computing device 102. Software and data used to practice embodiments of the present invention, e.g., binning program 120, can be stored on such portable computer readable storage media and can be loaded onto persistent storage 605 of computing device 102 via I/O interface(s) 606 of computing device 102. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for adjusting voltage on an integrated circuit chip, the method comprising:
    identifying, by one or more computer processors, a location that corresponds to an integrated circuit chip on a wafer, wherein identifying the location that corresponds to an integrated circuit chip on a wafer comprises identifying a radial timing bin that corresponds to the integrated circuit chip, wherein a radial timing bin is determined based on the on-chip variation and a radial distance from the integrated circuit chip to the center of the wafer;
    identifying, by one or more computer processors, an on-chip variation of the integrated circuit chip;
    determining, by one or more computer processes, a desired voltage for the integrated circuit chip based upon the identified on-chip variation of the integrated circuit chip and the identified location; and
    adjusting, by one or more computer processors, the voltage of the integrated circuit chip via a voltage regulated on the integrated circuit chip based upon the determined desired voltage.

2. The method of claim 1, wherein identifying a radial timing bin comprises:
    identifying, by one or more computer processors, the on-chip variation of the integrated circuit chip based upon variations related to a manufacturing process of the wafer; and
    assigning, by one or more computer processors, a radial timing bin based upon the distance from the center of the wafer to the integrated circuit chip and variations related to the manufacturing process.

3. The method of claim 1, further comprising:
    modifying, by one or more computer processors, the integrated circuit chip design based upon the desired voltage and the adjusted voltage.

4. The method of claim 1, wherein identifying the on-chip variation of the integrated circuit chip comprises:
    identifying, by one or more computer processors, an electronic chip identification for the integrated circuit chip, wherein the electronic chip identification includes the on-chip variation for the integrated circuit chip and a die location for the chip.

5. The method of claim 1, wherein identifying the on-chip variation of the integrated circuit chip comprises:
    identifying, by one or more computer processors, a timing bin location of the integrated circuit chip; and
    identifying, by one or more computer processors, a voltage requirement for the integrated circuit chip for the identified timing bin location.

6. The method of claim 1, wherein adjusting the voltage of the integrated circuit chip via a voltage regulated on the integrated circuit chip based upon the determined desired voltage further comprises:
    identifying, by one or more computer processors, a radial timing bin that corresponds to the integrated circuit chip; and
    adjusting, by one or more computer processors, the voltage based upon the identified radial timing bin.

7. A computer program product for adjusting voltage on an integrated circuit chip, the computer program product comprising:
    one or more computer readable storage media and program instructions stored on the one or more computer readable storage media, the program instructions comprising:
    program instructions to identify a location that corresponds to an integrated circuit chip on a wafer, wherein identifying the location that corresponds to an integrated circuit chip on a wafer comprises identifying a radial timing bin that corresponds to the integrated circuit chip, wherein a radial timing bin is determined based on the on-chip variation and a radial distance from the integrated circuit chip to the center of the wafer;
    program instructions to identify an on-chip variation of the integrated circuit chip;
    program instructions to determine a desired voltage for the integrated circuit chip based upon the identified on-chip variation of the integrated circuit chip and the identified location; and
    program instructions to adjust the voltage of the integrated circuit chip via a voltage regulated on the integrated circuit chip based upon the determined desired voltage.

8. The computer program product of claim 7, wherein program instructions to identify a radial timing bin comprises program instructions to:
    identify the on-chip variation of the integrated circuit chip based upon variations related to the manufacturing process of the wafer; and assigning a radial timing bin based upon the distance from the center of the wafer to the integrated circuit chip and variations related to the manufacturing process.

9. The computer program product of claim 7, further comprising program instructions to:
modify the integrated circuit chip design based upon the desired voltage and the adjusted voltage.

10. The computer program product of claim 7, wherein program instructions to identify the on-chip variation of the integrated circuit chip comprises program instructions to:
identify an electronic chip identification for the integrated circuit chip, wherein the electronic chip identification includes the on-chip variation for the integrated circuit chip and a die location for the chip.

11. The computer program product of claim 7, wherein program instructions to identify the on-chip variation of the integrated circuit chip comprises:
identify a timing bin location of the integrated circuit chip; and
identify a voltage requirement for the integrated circuit chip for the identified timing bin location.

12. The computer program product of claim 7, wherein program instructions to adjusting the voltage of the integrated circuit chip via a voltage regulated on the integrated circuit chip based upon the determined desired voltage further comprises program instructions to:
identify a radial timing bin that corresponds to the integrated circuit chip; and
adjust the voltage based upon the identified radial timing bin.

13. A computer system for adjusting voltage on an integrated circuit chip, the computer system comprising:
one or more computer processors;
one or more computer readable storage media;
program instructions stored on the computer readable storage media for execution by at least one of the one or more computer processors, the program instructions comprising:
program instructions to identify a location that corresponds to an integrated circuit chip on a wafer, wherein identifying the location that corresponds to an integrated circuit chip on a wafer comprises identifying a radial timing bin that corresponds to the integrated circuit chip, wherein a radial timing bin is determined based on the on-chip variation and a radial distance from the integrated circuit chip to the center of the wafer;
program instructions to identify an on-chip variation of the integrated circuit chip;
program instructions to determine a desired voltage for the integrated circuit chip based upon the identified on-chip variation of the integrated circuit chip and the identified location; and
program instructions to adjust the voltage of the integrated circuit chip via a voltage regulated on the integrated circuit chip based upon the determined desired voltage.

14. The computer system of claim 13, wherein program instructions to identify a radial timing bin comprises program instructions to:
identify the on-chip variation of the integrated circuit chip based upon variations related to the manufacturing process of the wafer; and
assigning a radial timing bin based upon the distance from the center of the wafer to the integrated circuit chip and variations related to the manufacturing process.

15. The computer system of claim 7, further comprising program instructions to:
modify the integrated circuit chip design based upon the desired voltage and the adjusted voltage.

16. The computer system of claim 13, wherein program instructions to identify the on-chip variation of the integrated circuit chip comprises program instructions to:
identify an electronic chip identification for the integrated circuit chip, wherein the electronic chip identification includes the on-chip variation for the integrated circuit chip and a die location for the chip.

17. The computer system of claim 13, wherein program instructions to identify the on-chip variation of the integrated circuit chip comprises:
identify a timing bin location of the integrated circuit chip; and
identify a voltage requirement for the integrated circuit chip for the identified timing bin location.

* * * * *